US008620945B2

(12) United States Patent
Chen et al.

(10) Patent No.: US 8,620,945 B2
(45) Date of Patent: Dec. 31, 2013

(54) QUERY REWIND MECHANISM FOR PROCESSING A CONTINUOUS STREAM OF DATA

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 12/888,427

(22) Filed: Sep. 23, 2010

(65) Prior Publication Data

US 2012/0078939 A1    Mar. 29, 2012

(51) Int. Cl.
*G06F 17/30*    (2006.01)

(52) U.S. Cl.
USPC ........................................................ 707/769

(58) Field of Classification Search
USPC ......... 707/615, 648, 670, 682, 684, 685, 702, 707/703, 713, 769, 826
See application file for complete search history.

(56) References Cited

U.S. PATENT DOCUMENTS

| 6,910,032 | B2 * | 6/2005 | Carlson et al. ................ 707/769 |
| 6,947,933 | B2 * | 9/2005 | Smolsky ........................ 707/693 |
| 7,310,638 | B1 * | 12/2007 | Blair ...................................... 1/1 |
| 7,315,923 | B2 * | 1/2008 | Retnamma et al. ........... 711/162 |
| 7,318,075 | B2 * | 1/2008 | Ashwin et al. .......................... 1/1 |
| 7,403,959 | B2 * | 7/2008 | Nishizawa et al. .................... 1/1 |
| 7,412,481 | B2 * | 8/2008 | Nicholls et al. ............... 709/204 |
| 7,739,265 | B2 * | 6/2010 | Jain et al. ....................... 707/713 |
| 7,860,884 | B2 * | 12/2010 | Lee et al. ....................... 707/769 |
| 7,861,050 | B2 * | 12/2010 | Retnamma et al. ........... 711/162 |
| 7,991,766 | B2 * | 8/2011 | Srinivasan et al. ............ 707/714 |
| 8,010,512 | B2 * | 8/2011 | Koyanagi et al. ............. 707/694 |
| 2007/0005579 | A1 * | 1/2007 | Grewal et al. ..................... 707/3 |
| 2008/0120283 | A1 * | 5/2008 | Liu et al. ........................... 707/4 |
| 2009/0106214 | A1 * | 4/2009 | Jain et al. .......................... 707/4 |
| 2009/0228434 | A1 * | 9/2009 | Krishnamurthy et al. ........ 707/2 |
| 2009/0271529 | A1 | 10/2009 | Kashiyama et al. |
| 2009/0287628 | A1 | 11/2009 | Indeck et al. |
| 2009/0327257 | A1 * | 12/2009 | Abouzeid et al. ................ 707/4 |
| 2010/0088274 | A1 * | 4/2010 | Ahmed et al. ................ 707/610 |
| 2010/0318495 | A1 * | 12/2010 | Yan et al. ...................... 707/618 |
| 2011/0060890 | A1 * | 3/2011 | Tanaka et al. ................. 712/201 |
| 2011/0119262 | A1 * | 5/2011 | Dexter et al. ................. 707/726 |
| 2011/0125778 | A1 * | 5/2011 | Kubo ............................ 707/769 |
| 2011/0196856 | A1 * | 8/2011 | Chen et al. ................... 707/713 |

OTHER PUBLICATIONS

Damian Black, Relational Asynchronous Messaging: A New Paradigm for Data Management & Integration, Jan. 2007.
SQL Stream, Query the Future: SQLstream's RAMMS Solutions and Applications, 2009 SQL Stream Incorporated.

* cited by examiner

*Primary Examiner* — Jean M Corrielus
*Assistant Examiner* — Evan Aspinwall

(57) ABSTRACT

A query engine receives a continuous stream of data and applies a Structured Query Language (SQL) query to the data. The data is processed on a chunk-by-chunk basis with a query rewind mechanism that sustains the SQL query as a single long-standing query that allows a state of the SQL query to be maintained.

15 Claims, 3 Drawing Sheets

QUERY REWIND MECHANISM FOR PROCESSING A CONTINUOUS STREAM OF DATA

BACKGROUND

The amount of data stored in database (DB) systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Many applications are based on data being continuously collected and provided to databases. Such databases pose challenges to efficiently process and query data in a timely fashion.

DETAILED DESCRIPTION

Figure 1:
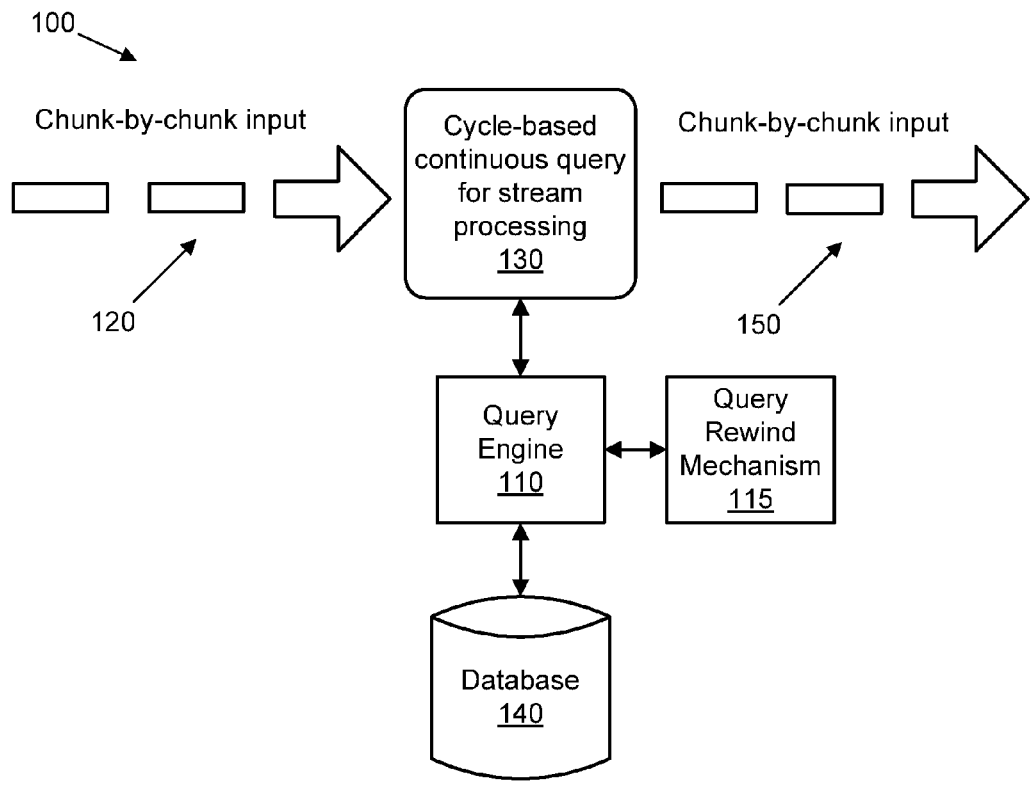
FIG. 1 shows a database system with a query engine in accordance with an example implementation.

Example implementations are systems, methods, and apparatuses for stream processing that apply queries to data chunks of a continuous data stream. The data stream is divided into chunks for Structured Query Language (SQL) queries and User Defined Functions (UDF) based analysis while the data chunks of multiple streams are synchronized. A rewind mechanism processes the data chunk-by-chunk and enables a single long-standing query instance to be sustained, which allows the state of the query and UDFs invoked in the query to be maintained across cycles.

Stream processing deals with unbound data sequences but often on the per chunk basis divided by time windows, such as calculating the aggregates or statistics of every ten minutes of data, or the moving averages of five minutes of sliding windows. Integrating data-intensive stream processing with SQL-based query processing under the notion of a continuous query enables benefits, such as fast data access, reduced data transfer and SQL expressive power, and leveraging of existing database technology, such as transaction management.

With continuous streams of data, some techniques apply an SQL query to the entire input data set rather than chunk-by-chunks of data. Such techniques repeatedly launch a same query on each window of data that is scheduled by the workflow system. These techniques have several shortcomings: the stream process system is built on top of the query engine with overhead in workflow scheduling, memory management and inter-process communication; the stream processing is not made by a true continuous query but by multiple query executions with set up/tear-down overhead. Since these executions are isolated in memory context, the result and state of a window query execution, as well as of the UDFs invoked by the query, cannot be sustained and carried over windows.

Stream processing supports continuous and incremental analytics over data before the data are loaded in the database (as opposed to a traditional store-first query-later approach). Stream processing is characterized by Continued Query or Continuous Query (CQ) and by dealing with a sequence of data chunks falling in time windows. With the existing techniques, however, a CQ is actually implemented by multiple query instances scheduled to run based on time-delta or other events. The majority of current stream processing systems are built from scratch without leveraging the Database Management System (DBMS) functionality. Furthermore, with traditional techniques, the SQL query is applied to the entire input relation, rather than the incoming relational data chunk-by-chunk corresponding to the (time) windows. Existing approaches are characterized by caching the data chunk according to the window boundary, and using a workflow-like scheduling mechanism to apply an operator or a query to the data chunk. In this case, the data chunks are processed by multiple separate executions of a query, one for each data chunk. In the database engine, such individual query instances have isolated memory spaces. Once a query is torn down, its memory context disappears. One way for the multiple execution of the query to carry on state (e.g. for aggregation) is through the use of temporary relations, but such relations lead data access overhead. Example embodiments use continuous query that is not torn down, and include the capability to generate the sequence of query results by applying the query to the data chunks one-by-one.

Example embodiments use a cut-and-rewind approach to apply an SQL query on a chunk-by-chunk basis of data of the input stream. At the bottom of a query tree for stream processing is a stream source function that accepts events to generate stream elements. Based on the given cut condition, an end-of-data message is signaled by the stream source function to the query engine to terminate the query execution. Upon receiving this signal, the query engine executes a query rewind (as opposed to shutting down and restarting processing of the data falling in a subsequent window).

While rewinding a query applied to static data means re-scanning the same data, rewinding a query applied to continuous stream data means reactivating the stream source function for processing the newly incoming data. With the cut- and rewind mechanism according to example embodiments, a stream is naturally processed chunk-by-chunk by the designated query with the full SQL expressive power. Two or more streams may be joined under the cut semantics where the query rewinding point serves as a synchronization point of processing these streams. While the conventional query evaluation is a tuple-by tuple iterative process, stream processing with the cut- and rewind mechanism is considered as a Super Iterative Continuous Query (SICQ) process over chunk-by-chunk evaluation cycles.

In order to support the cut- and rewind mechanism, functionalities of the query are extended that benefit the stream processing. For example, the SICQ approach allows tight integration of stream processing and query processing as SICQ is directly supported by the extended query engine, rather than by a workflow system built outsides of the query engine. The SICQ is a continuous query (i.e., it is not stopped or shutdown), which eliminates the query set up/tear-down overhead.

The SICQ further allows the results and states of every window processing cycle to be sustained and carried onto the next cycle. Continuation of the query instance enables various incremental computations with flexible granularities, and allows static data (e.g. data used in a UDF) to be loaded only once, rather than the data being repeatedly fetched cycle-by-cycle.

The CQ approach with example embodiments differs from regular querying in several aspects. Stream data are captured by stream source functions, which are a special kind of User Defined Function (UDF) that is extended with support from the query engine. Further, the CQ does not stop and continuously processes the stream with a single long-standing query, rather than a large number of periodically setup/tear-down short queries.

Existing database systems store the data first and later analyze the data. Due to the massively growing data and pressing need for low latency, example embodiments instead analyze the data in real-time (i.e., on the fly) at the query engine before the data is stored in the database. As explained more fully below, the query engine continuously analyses the incoming data stream (as opposed to storing the data on a disk, retrieving the data from the disk, and then analyzing the data).

FIG. 1 shows a database system 100 with a database or query engine 110 that includes a SICQ engine and/or a PostgreSQL engine in accordance with an example implementation. The query engine is in communication with a query rewind mechanism or rewind mechanism 115. Multiple input streams 120 (shown as chunk-by-chunk input) are input to a cycle-based continuous query for stream processing 130, which is in communication with the query engine 110 and a database 140. The processed input streams are output 150 (shown as chunk-by-chunk output).

Example embodiments utilize the query engine 110 and query rewind mechanism 115 for in-DB stream processing. The query engine processes endless data streams 120 in a record-by-record or tuple-by-tuple fashion and implements the query rewind mechanism to sustain the query as a single long-standing query, rather than a large number of periodically setup/tear-down short queries (i.e., rather than numerous, single queries issued on the incoming continuous data stream).

Many enterprise applications are based on information or data that is continuously collected. This data is processed as automatic information derivation. Automatic information derivation is a continuous querying and computation process where an operation is driven by input data streams 120 and outputs to other data streams 150. In this way, the process acts as both a stream consumer and a stream producer. Since input is continuous (i.e., does not end), the process does not cease; although it may have different paces at different operations.

Figure 2:
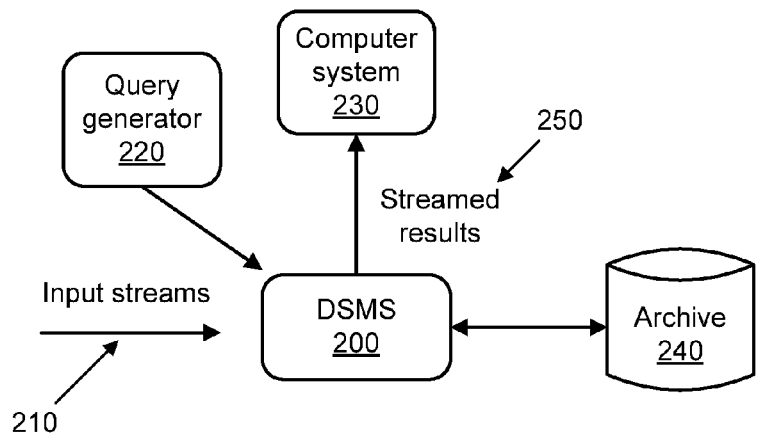
FIG. 2 shows a data stream management system in accordance with an example implementation.

FIG. 2 shows a data stream management system (DSMS) 200 in accordance with an example embodiment. A continuous input stream 210 is provided to the DSMS 200 (which includes the query engine of FIG. 1), which is in communication with a continuous query generator 220, computer system 230, and archive 240. Streamed results 250 are provided to the computer system 230.

In one embodiment, the input stream is an unbounded bag of tuple and timestamp pairs. Windowing operators convert the input streams into relations that are then transformed back into an output or answer stream.

Example embodiments build window functions or operators for query engine enabled stream processing. The window operator is history-sensitive in the sense that it has the capability of keeping the data state in a window of time (e.g. 1 minute) or granule (e.g. 100 tuples), and executing the required operation, such as delta-aggregate, to those data. Window operations are handled by a long-standing forever query, rather than by separate individual short queries. Window operations are directly scheduled by the query engine rather than by an external scheduler or database program (e.g. a PL/SQL script or a stored procedure).

Various window operations with different granularities and for different applications can be specified in a single query and these windows are allowed to be overlapping. Example embodiments support at least two kinds of window operations. These window operations include delta window operations on the data apart of given time or cardinality ranges (e.g. every 1 minute or every 100 tuples) and sliding windows. Further, static data retrieved from the database is cached in a window operation. In one example embodiment, this static data is loaded only once in the entire long-standing query, which removes much of the data access cost of the multi-query based stream processing.

In one example embodiment, the SICQ is extended by a PostgreSQL engine. This engine directly leverages the SQL language and the query engine for stream processing. For example, the SICQ expresses stream processing directly using extended SQL with UDFs. The SICQ engine is an extension of the query engine, rather than a system built "on top" of the query engine.

Figure 3:
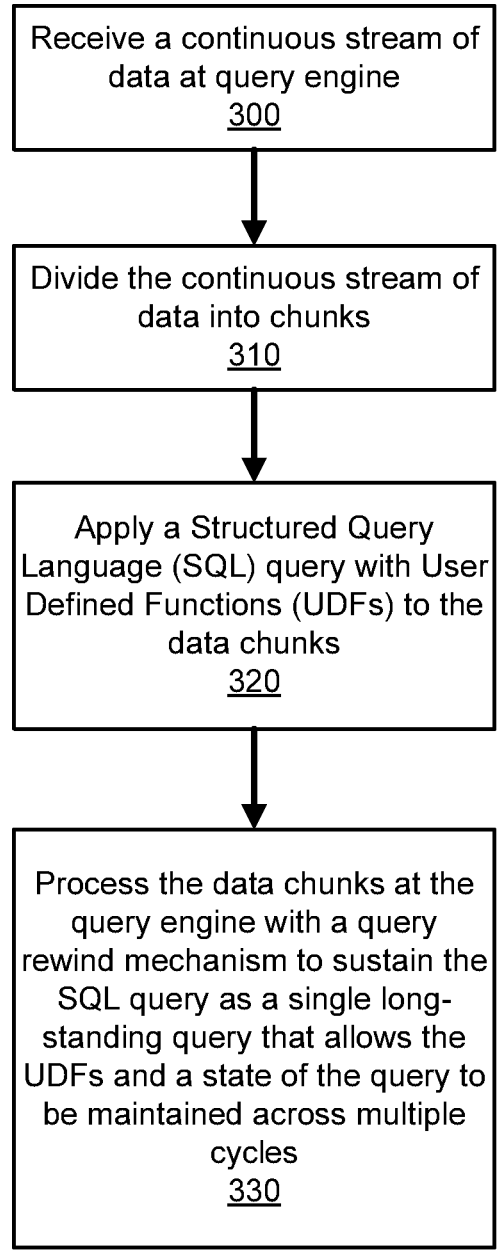
FIG. 3 shows a flow diagram for processing a continuous stream of data in accordance with an example implementation.

FIG. 3 shows a flow diagram for processing a continuous stream of data in accordance with an example implementation.

According to block 300, a continuous stream of data is received at a query engine.

According to block 310, the continuous stream of data is divided into data chunks.

According to block 320, an SQL query with UDFs is applied to the data chunks of the continuous stream of data.

According to block 330, the data chunks are processed at the query engine with a query rewind mechanism to sustain the SQL query as a single long-standing query that allows the UDFs and a state of the query to be maintained across multiple cycles.

Example embodiments apply the SQL query to data on a chunk-by-chunk basis rather than to an entire data set. The query instance is iteratively rewound with a query rewind mechanism for processing the data in time windows. The query runs in cycles for processing data chunk-by-chunk. In each cycle, the query applies to the data falling in a window boundary (as opposed to being applied to the entire data set). As continuous streaming data flows in and out of the query engine, rewinding the query applies to the new data flowing in, which is very different from re-scanning a static data set.

An example embodiment, sustains a query state across running cycles. As a SICQ is rewinding but not torn down, the query result is maintained and the data is stored in UDFs over cycles. This stored data is used, for example, to aggregate the results obtained in multiple cycles and to maintain the UDF state continuously regardless of cycle boundaries, which may be used for handling continuous sliding windows without the discontinuation around cycle/chunk boundaries. This feature enables aggregating stream data in multiple levels with various degrees of granularity.

In one example embodiment, the stream processing is executed by a long-standing SQL query instance, rather than by multiple event driven query instances. Further, the query evaluation is an iterative processing. The operators, except the scan operators, apply to data one tuple at a time. These operators form a query tree where a parent operator requests its child operator to deliver the "next" result as its input. In turn, the child operator requests its own child operator to deliver the "next" result, and this process continues. The states maintained in aggregate operators and in UDFs are continued across tuple-by-tuple operator invocations.

SICQ execution is a super iterative process in the sense that the same query is applied to the data on a chunk-by-chunk basis for supporting stream window semantics. Further, since the SICQ does not stop (i.e., is continuous), its states (i.e., the cycle execution results and the data kept in the UDFs) are continued across cycles. Cut-and-rewind is consistently handled at two levels of the stream query processing: the function scan level and the overall query execution level.

A discussion now turns to the cut mechanism. The operators at the leaf level of a query tree are data access operators, known as scan operators that are further classified into operators for table-scan, index-scan, function scan, etc. Unlike other relational operators that deliver per tuple result in each invocation, a scan operator typically materializes a block or even the entire resulting tuple set first and then has the tuple fetched one-by-one by its parent operator. A query is executed from the root of the query tree in a demand driven, iterative fashion, where a parent operator requests its child operators to deliver the next tuple. In turn, the child operator requests its own child operators to deliver the next tuple, until reaching the scan operators.

As disclosed earlier, example embodiments use SQL query based stream processing to scan and generate stream data at two levels. At the lower level is a Stream Source Function (SSF) that gets input events by listening to an event source, reading data from files, etc., and outputs tuples with the predefined relation schema. At the higher level is the SSF scan operator that invokes the SSF once for delivering one tuple to the query as a stream element. The SSF scan operator invokes the SSF by passing in a system handle, function call Handle (fcH); and a data structure contains the function call information referenced by both, which is used for their communication.

In one example embodiment, the SSF scan operator belongs to the query engine, and the SSF is a User Defined Table Function for the designated stream data. In the other words, for stream data generation, the SSF scan operator is the fixed part and the SSF is the changeable part. SSFs are a new kind of data sources that alter the query engine's block based function scan method to retrieve stream elements (tuples) from SSF on the per-tuple basis, which constitutes the start point for SQL query based stream processing.

A SSF can stop delivering tuples by signaling the "end-of-data" to the SSF scan operator. Upon receipt the "end-of-data" message, the SSF scan operator returns NULL to its own parent operator and in this way terminates the current query execution. The SSF informs the "end-of-data" status to the SSF scan operator through updating a designated field of the fcH mentioned above.

While signaling the "end-of-data" provides the way to terminate the query execution, it actually "cuts" the stream data into chunks. Cutting data into chunks is based on application-oriented conditions. One example condition is based on the chunk size (i.e., the number of tuples contained in each chunk). The most frequently used condition is the time window (e.g., a five-minute time window) for the stream data with timestamps.

The cut mechanism is one part of the SICQ approach. The next issue is to maintain the query instance across the query executions on multiple data chunks in order to continue the execution states and results.

A discussion now turns to the query rewind mechanism or the rewind mechanism. The Cut-and-Rewind approach applies a SQL query to the data chunk-by-chunk (rather than entirely) while keeping the query instance alive across multiple chunk-oriented executions. This sustains and continues the execution states and provides incremental time-window based computation, aggregation, etc.

As mentioned above, at the bottom of the query tree for stream processing is the stream source function that accepts events to generate stream elements. Based on the given cut condition, the "end-of-data" is signaled by the stream source function to the query engine to terminate the query execution. Here the query rewinds (rather than undergoing a shutdown/restart operation) for processing the data falling in the subsequent window. Two or more streams may be joined under the cut semantics where the query rewinding point serves as the synchronization point of processing these streams.

While the conventional query evaluation is a tuple-by tuple iterative process, stream processing with rewind query is a Super Iterative Continuous Query (SICQ) process over chunk-by-chunk evaluation cycles. In regular query processing, the executor processes a tree of "plan nodes." The plan tree is essentially a demand-pull pipeline of tuple processing operations. Each node, when called, produces the next tuple in its output sequence, or produces NULL if no more tuples are available. If the node is not a primitive relation-scanning node, the child node(s) are called to obtain input tuples.

The plan tree delivered by the planner includes a tree of plan nodes. Each plan node has expression trees that represent its target list, qualification conditions, etc. During executor startup, one example embodiment builds a parallel tree of identical structures containing executor state nodes (e.g., every plan and expression node type has a corresponding executor state node type). Each node in the state tree has a pointer to its corresponding node in the plan tree, plus executor state data as needed to implement that node type. This arrangement allows the plan tree to be read-only as far as the executor is concerned: the data that is modified during execution is in the state tree.

The control flow for query processing is shown below.
(1) Create Query Descriptor.
(2) Start Execution—Create Plan Instance, Create execution context and allocate memory space.
(3) Execute.
(4) End Execution—recursively release resources and free memory.
(5) Free Query Descriptor.

With rewind mechanism, the control flow for query processing becomes the following:
(1) Create Query Descriptor.
(2) Start Execution—Create Plan Instance, Create execution context and allocate memory space.
(3) EXEC: Execute on a chunk of data ended by the end-of-data signal.
(4) Rewind the query plan instance, go to EXEC (process data chunk by chunk in a loop).
(5) End Execution—recursively release resources and free memory.
(6) Free Query Descriptor.

Rewind is based on the rescan utilities of the DBMS. An example use of rewind is to rewind a fetch cursor to re-fetch the query result. In tuple-wise query processing, the resulting data is sent to the client through a server-client connection tuple-by-tuple. If the results are not materialized, rescan includes a re-calculation; otherwise the materialized data is retrieved directly. The rescan utility has wider application in addition to support rewind. For example, in nested loop join, the left plan state tree is rescanned.

In one embodiment, the rescan is made top-down along the PlanState tree, at any level. If the results are materialized, the results are reused without further rescan. The hash groups in aggregate/group belong to this case, where the re-scan function returns the materialized data without further query processing action. This is seen in some other rescan functions such as those for dealing with sorting, limiting, etc. However, in the cut-and-rewind based cycle query for stream processing, the situation is different. Here, rewinding the query instance is reset to the original state for the plan nodes, and then started to process the new streaming data, rather than the previous data. In this case we need to disable the use of materialized results and enforce recalculating based rescan. This is due to a difference in querying static data and in querying stream data. In querying static tables, the values of the tables remain unchanged during rescan, and therefore the materialized data at any level of the Plan State tree are still valid for reuse. In this case, further rescanning of the sub-tree is not necessary.

For querying stream data in a new cycle of the same query instance, previously materialized data are not valid since the stream data are new corners. In this case, one embodiment discards the materialized results and enforces recalculation of them. This cycle-rescan is performed level-by-level along the Plan Stat tree.

While reusing the DBMS rescan facility with appropriate extension to support the proposed cycle-rescan, one example embodiment identifies when the cycle-rescan is to be used and when the regular rescan is to be used in order not to alter the normal behavior and performance of the DBMS. In order not to alter the normal behavior of the database engine, streaming queries are identified. A stream query is identified as follows:

(1) Get a Boolean value as the flag of Stream Query (or cycle query) from query parser.
(2) Place this information into Query Descriptor.
(3) Pass the information to the Plan State tree level-by-level (e.g., for each node pass this value to its sub-node, left node, right node, and other component nodes).
(4) In the rescan functions, disable the use of materialized results and enforce reprocessing (e.g., perform this function for stream cycle queries by checking the flag).
(5) After rewinding, clear the stream cycle query flag from the query plan state tree level-by-level in order to have regular options of the rescan facility that is used in the query processing.

One example embodiment is illustrated in a linear-road benchmark for stream processing. This benchmark models the traffic on automobile expressways. The input stream tuples contain the position (segment) and speed of a car (identified by the vehicle id-vid) at a time (second, starting from 0). These tuples are delivered by the stream source function STREAM_CYCLE_LR(time, cycles, xway) where the parameter time is the number of seconds in a query cycle as the data chunk boundary, and cycles is the number of cycles the query is supposed to run. For example, STREAM_CYCLE_LR(60, 60, 1) delivers the 1 minute (60 seconds) data chunks for 1 hour (60 chunks) for express way 1. The segment statistics computation is computed for every minute that cars are in each expressway with each segment being identified as the bottleneck of the benchmark.

The query for generating the active cars in each segment, each direction in each minute is expressed as follows:

```
select
    floor(time/60)::integer as minute,
    xway, dir, seg , count(distinct Vid) as active_cars
from STREAM_CYCLE_lr_producer(60, 60, 1)
group by minute, xway, dir, seg.
```

This query cuts data in one minute time-windows and rewinds 60 times. It is a single query instance that is applied to data on a chunk-by-chunk basis, which yields chunk-wise results. The query for calculating the average speed in each segment, each direction in each minute is expressed as follows:

```
select floor(time/60)::integer as minute, xway, dir, seg, avg(speed)
from STREAM_CYCLE_lr_producer(60, 60, 1)
group by minute, xway, dir, seg.
```

The query for calculating the past five minutes average speed in each segment, each direction in each minute is expressed as follows:

```
select p.minute, p.xway, p.dir,
p.seg,lr_moving_avg(0, xway, dir, seg, minute, minute_avg_speed) as past_5m_avg_speed
from (
    select floor(time/60)::integer as minute, xway, dir, seg,
        avg(speed) as minute_avg_speed
    from STREAM_CYCLE_lr_producer(60, 10, 1)
    group by minute, xway, dir, seg) p.
```

This query calculates the average speed of cars in each section in the past five minutes by a sliding window function lr_moving_avg( ). Here, the per-minute average speed is calculated by the query with respect to each minute, but the moving average is calculated by the function and buffers the minute average results continuously regardless of cycle boundaries. This is why we rewind rather than reinitiate the query instance to keep the query instance state across cycles.

The combined query for generating both active car number and past five minutes average speed in each segment and each direction in each minute is expressed as follows:

```
select p.minute, p.xway, p.dir, p.seg, p.active_cars,lr_moving_avg(0,
xway, dir, seg, minute, minute_avg_speed) as past_5m_avg_speed
from (
    select floor(time/60)::integer as minute, xway, dir, seg,
        avg(speed) as minute_avg_speed, count(distinct Vid) as active_cars
    from STREAM_CYCLE_lr_producer(60, 10, 1)
    group by minute, xway, dir, seg) p.
```

The two streams sources are joined. For example, assuming that the stream data delivered by the stream source function S1 are more frequently than that delivered by S2. The stream data delivered by S1 are cut on every 100 tuples, and the stream data delivered by S2 are cut on every 10 tuples. The following query joins every 100 tuples of S1 data with every 10 tuples S2 data in each of the 100 cycles. This query actually provide a kind of "sync" to these two data streams as follows:

```
select r1.pid, r2.v from
    (select p.pid AS pid, p.x AS x, p.y AS y
    from STREM_S1(100, 100) p) r1,
    (select pp.pid AS pid, points_catch(pp.pid, pp.x, pp.y) AS v
    from STREAM_S2(10, 100) pp) r2
where r1.pid = r2.pid order by r1.pid DESC.
```

With example embodiments, SICQ leverages the full power of SQL and DBMS, and integrates stream processing and data management. Additionally, SICQ extends the query engine capability for applying a query, with full SQL expressive power, to data chunks rather than to the entire data set. Also, with SICQ, a data stream divided or cut to chunks for SQL/UDF based analysis, while the data chunks of multiple streams with the same or different window conditions are synchronized by the query applied to them (e.g., join two streams in every five minutes, join every 100 tuples of stream A and every 10 tuples of stream B). Further yet, since a SICQ processes data chunk-by-chunk by rewinding rather than by shutting down and/or re-starting, the single long-standing query instance sustains and allows the state of the query and the states of the UDFs invoked in the query to maintained or stored and continued across cycles. With this feature, the static data for per-tuple processing is loaded once (as opposed to being reloaded in each cycle), and the operations, such as sliding window operations, continue without affected by the window boundaries.

Figure 4:
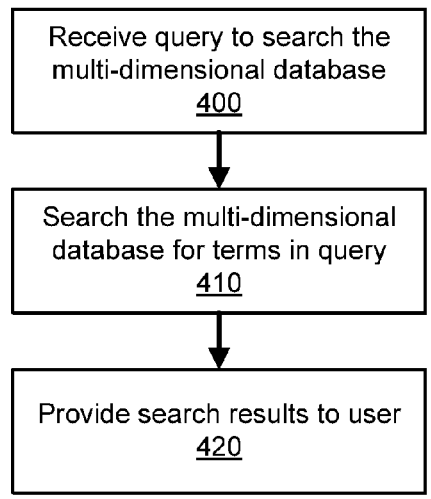
FIG. 4 shows a method in accordance with an example implementation.

FIG. 4 is a flow diagram for traversing a multidimensional database while searching a query in accordance with an exemplary embodiment. By way of example, the flow diagram is implemented in a data center that receives stores data in a database, receives queries from a user, and executes the queries, provides search or query results back to the user.

According to block 400, a query is received to search a multi-dimensional database.

According to block 410, the database is searched for the terms or keywords in the query.

According to block 420, results of the query are provided to the user. For example, the results of the query are displayed to the user on a display, stored in a computer, or provided to another software application.

Figure 5:
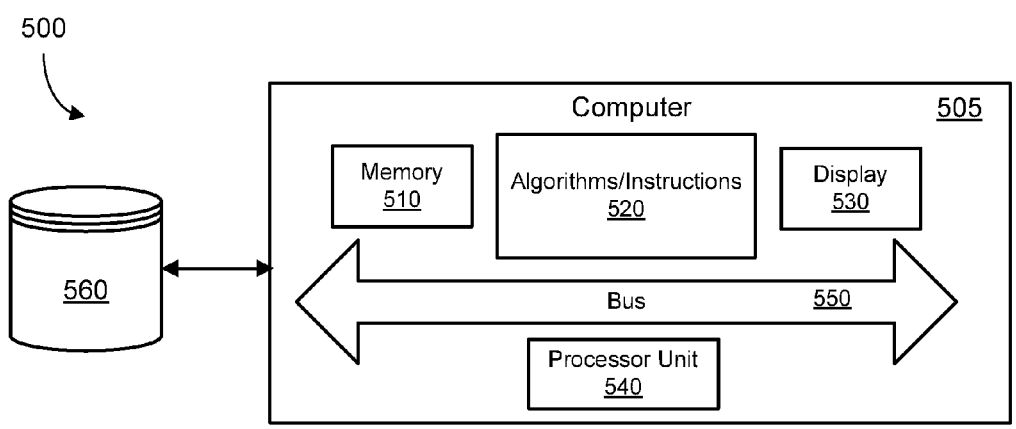
FIG. 5 shows a computer system in accordance with an example implementation.

FIG. 5 is a block diagram of a computer system 500 in accordance with an exemplary embodiment of the present invention. By way of example, the computer system is implemented in a data center.

In one embodiment, the computer system includes a database or warehouse 560 (such as a multidimensional database) and a computer or electronic device 505 that includes memory 510, algorithms and/or computer instructions 520, display 530, processing unit 540, and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The processing unit 540 communicates with memory 510 and algorithms 520 via one or more buses 550 and performs operations and tasks necessary for constructing models and searching the database per a query. The memory 510, for example, stores applications, data, programs, algorithms (including software to implement or assist in implementing embodiments in accordance with the present invention) and other data.

As used herein and in the claims, the following words are defined as follows:

The term "continuous query" is a registered query that is continuously and/or repeatedly triggered.

The term "database" means records or data stored in a computer system such that a computer program or person using a query language can send and/or retrieve records and data from the database.

The term "database management system" or "DBMS" is computer software designed to manage databases.

The term "data stream management system" or "DSMS" is computer software that controls the maintenance and querying of data streams. The DSMS issues continuous queries against the data stream, as opposed to a conventional database query that executes once and returns a set of results for the query. The continuous query continues to execute over time, even as new data enters the data stream.

The term processing the query on a "chunk-by-chunk" basis is means a set of data that falls within a time window (e.g., a one minute time window).

The term "multidimensional database" is a database wherein data is accessed or stored with more than one attribute (a composite key). Data instances are represented with a vector of values and a collection of vectors (for example, data tuples) that are a set of points in a multidimensional vector space.

The term "query rewind mechanism" or "rewind mechanism" is an apparatus or method that rewinds the query execution state to the beginning state for processing the next chunk of data without shutting-down and/or restarting the query instance.

The term "single long-standing query" is a single query instance, rather than multiple instances (i.e., executions) of the same query.

The term "Structured Query Language" or "SQL" is a database computer language that retrieves and manages data in a relational database management systems (RDBMS), database schema creation and modification, and database object access control management. SQL provides a language for an administrator or computer to query and modifying data stored in a database.

The term "stream" is a time varying data sequence. For example, a stream can be a continuous sequence of (tuple, timestamp) pairs, where the timestamp defines an order over the tuples in the stream.

The term "query engine" is a component of a database management system that is used to evaluate queries (e.g., SQL queries) to generate responses or answers to the queries.

The term "User Defined Functions" or "UDF" is a function in a program that provides a mechanism for extending the functionality of a database server by adding a function that can be evaluated in SQL statements.

The term "window functions" is a function that is applied to the data falling in the window of value range (e.g., the data between the values of 100-200) and/or the window of time (e.g., is a time window such as every one minute).

In one example embodiment, one or more blocks or steps discussed herein are automated. In other words, apparatus, systems, and methods occur automatically.

The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A method executed by a computing system, comprising:
receiving, at a query engine in a database system, a continuous stream of data in data chunks;
applying a Structured Query Language (SQL) query with User Defined Functions (UDFs) to the data chunks of the continuous stream of data; and
processing, by the database system, the data chunks on a chunk-by-chunk basis with a query rewind mechanism to sustain the SQL query as a single long-standing query that allows the UDFs and a state of the SQL query to be maintained.

2. The method of claim 1 further comprising:
receiving, at the query engine, an end-of-data message that instructs the query engine to terminate execution of the SQL query; and
executing the query rewind mechanism in response to receiving the end-of-data message.

3. The method of claim 1 further comprising:
activating the query rewind mechanism; and
reactivating a stream source function for processing newly incoming data in the continuous stream of data in response to activating the query rewind mechanism.

4. The method of claim 1 further comprising, joining two continuous streams of data where the query rewind mechanism serves as a synchronization point that processes the two continuous streams of data.

5. The method of claim 1, wherein static data in the UDFs are loaded only once rather than repeatedly fetching the static data in a cycle-by-cycle manner.

6. A tangible, non-transitory computer readable storage medium storing instructions that, when executed by a database system, cause the database system to:
receiving, at a query engine, a continuous stream of data;
processing, at the query engine, a Structured Query Language (SQL) query on the continuous stream of data on a chunk-by-chunk basis; and
activating a query rewind mechanism to sustain the SQL query as a single long-standing query.

7. The tangible, non-transitory computer readable storage medium of claim 6, wherein the SQL query is the single long-standing query as opposed to multiple queries that are repeatedly launched on windows of data.

8. The tangible, non-transitory computer readable storage medium of claim 6 further comprising, capturing the continuous stream of data with stream source functions, wherein the stream source functions are kind of User Defined Function that is extended with support from the query engine.

9. The tangible, non-transitory computer readable storage medium of claim 6, wherein the query engine continuously analyzes the continuous stream of data, as opposed to storing the data on a disk, retrieving the data from the disk, and subsequently analyzing the data.

10. The tangible, non-transitory computer readable storage medium of claim 6 wherein the query rewind mechanism iteratively rewinds the SQL query for processing the continuous stream of data in time windows.

11. A computing system, comprising:
a database;
a query engine in communication with the database, the query engine receives a continuous stream of data and a query; and
a query rewind mechanism that processes, on a chunk-by-chunk basis, the continuous stream of data as a single long-standing query.

12. The computing system of claim 11, wherein the query is applied to the continuous stream of data on a chunk-by-chunk basis as opposed to being applied to an entire input relation of the continuous stream of data.

13. The computing system of claim 11, wherein the query is sustained across multiple running cycles and data from the query is stored in User Defined Functions (UDFs) over the multiple running cycles such that states of the UDFs are maintained continuously regardless of cycle boundaries.

14. The computing system of claim 11, wherein an end-of-data message terminates execution of the query and cuts the continuous stream of data into chunks that are based on a window of time.

15. The computing system of claim 11, wherein the query rewind mechanism rewinds the query for processing data falling in a subsequent window of time.

* * * * *